Patented Jan. 26, 1943

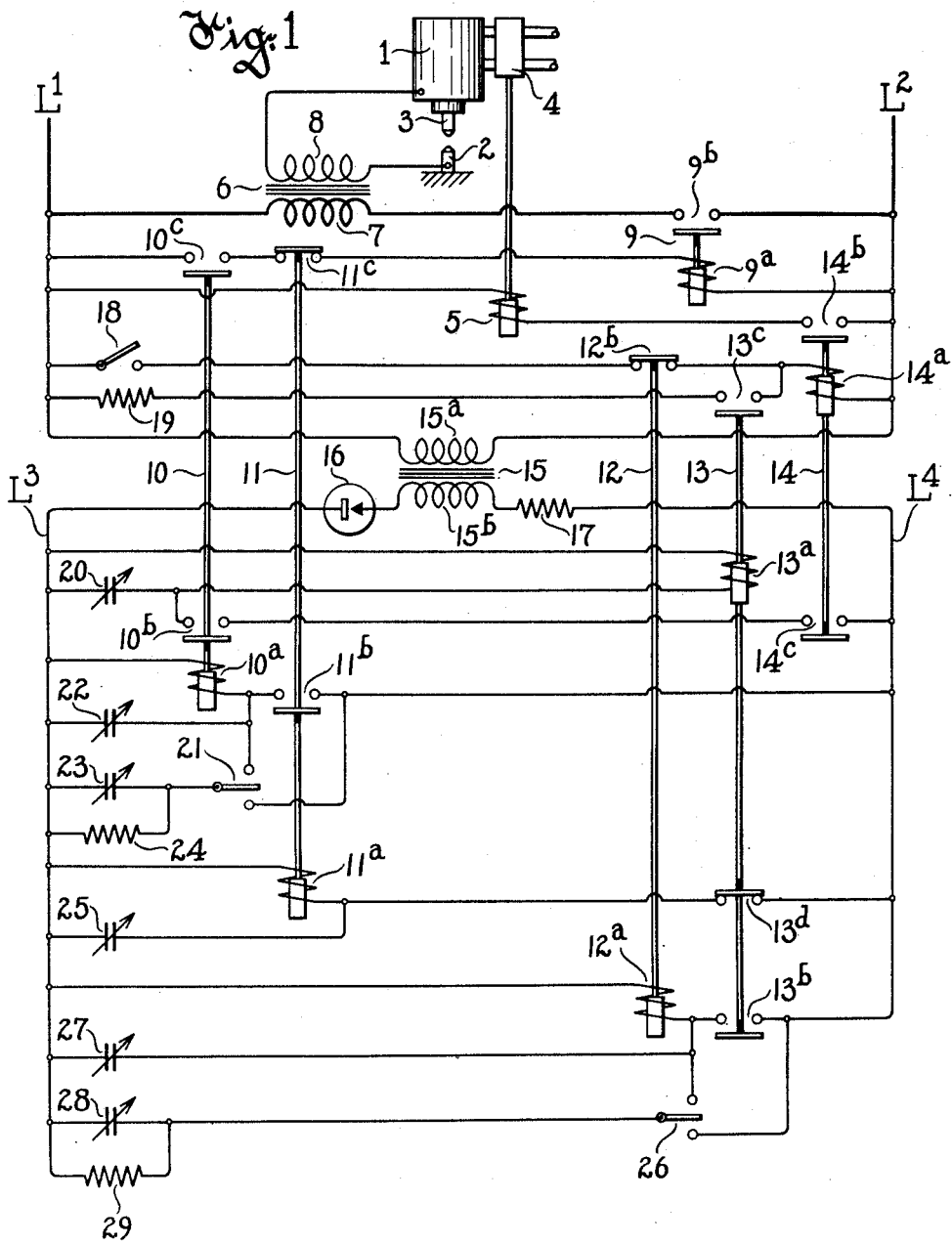

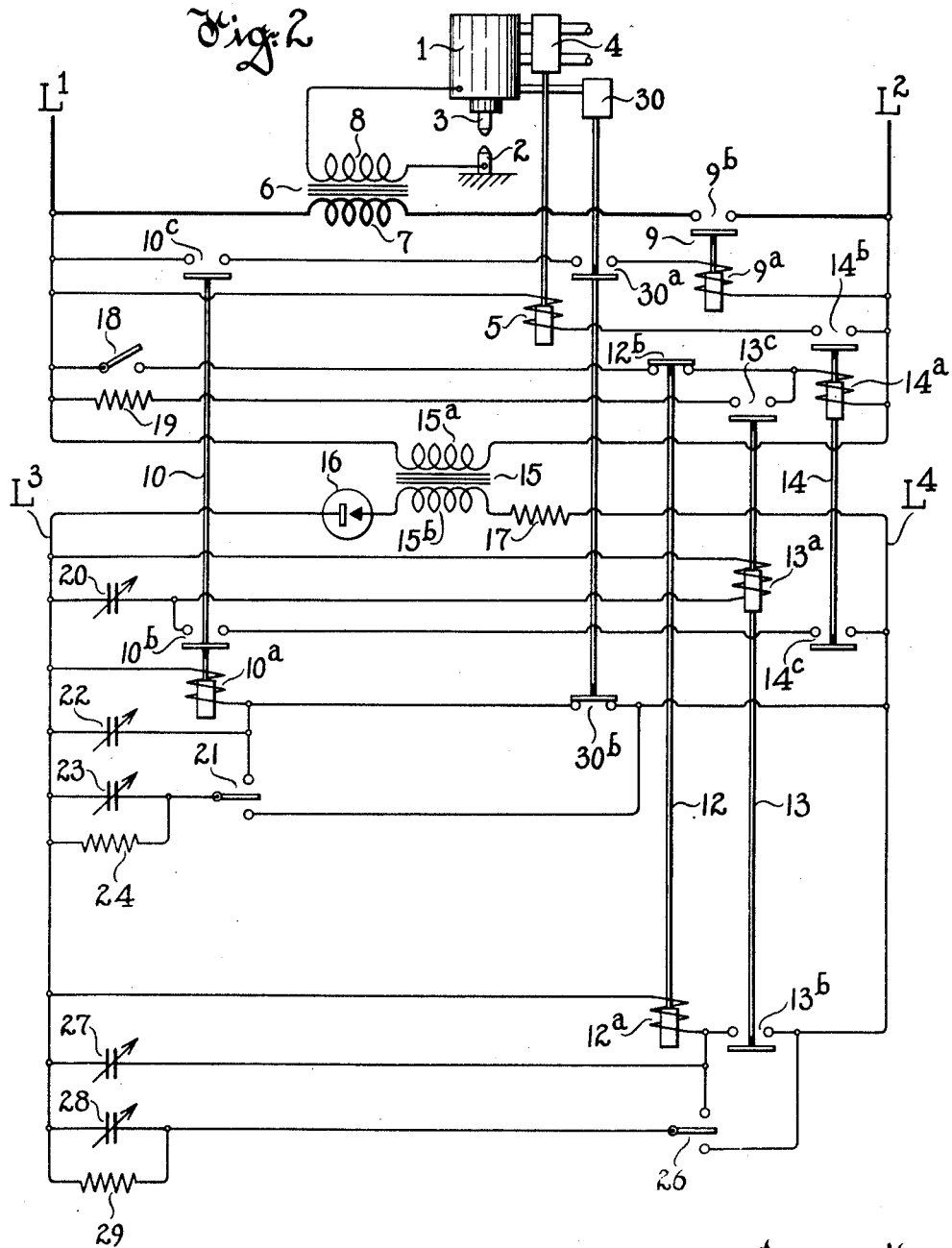

2,309,280

UNITED STATES PATENT OFFICE 2,309,280

WELDING CONTROLLER

Carroll Stansbury, Wauwatosa, Wis., assignor to Cutler-Hammer, Inc., Milwaukee, Wis., a corporation of Delaware Application April 13, 1939, Serial No. 267,596

7 Claims. (Cl. 175—320)

This invention relates to an electric controller for a machine which performs a number of interrelated operations which are repeated in predetermined cycles whereby the intervals between the various operations are controlled by individual electromagnetic relays the responses of which are dependent upon the discharge of stored electrical energy and while not limited thereto, the invention is particularly adapted to controllers for electric welders.

An object of the invention is to provide a controller in which the time intervals between the successive steps of a complete welding cycle are controlled individually by the discharge of a corresponding condenser energy storage circuit.

Another object is to provide a controller of the aforementioned type in which the various time intervals are easily adjustable.

Another object is to provide a controller in which the various time intervals are adjustable independently of each other.

Another object is to provide a controller in which the time intervals are controlled by purely electrical means without dashpots or other mechanical retarding devices.

Another object is to provide a controller in which the welding cycle is automatically repeated, but the operation may be interrupted upon completion of any cycle at the will of the operator.

Another object is to provide a controller which assures the completion of a welding cycle after it has once been initiated by the operator.

Other objects and advantages will hereinafter appear.

The accompanying illustrate control systems embodying the invention.

In the drawings, Figure 1 is a schematic wiring diagram of a welder control system constructed in accordance with my invention, and Fig. 2 is a modification of the system illustrated in Fig. 1.

Referring to Fig. 1 the same illustrates a pneumatic welder having a cylinder 1, a stationary electrode 2 and a movable electrode 3. The latter is normally held out of engagement with the former by the piston of the cylinder 1 to which it is attached. If it is desired to press the electrodes together the valve 4 which may be any suitable type of reversing valve and which controls the admission of pressure fluid to the cylinder, is reversed by energization of a solenoid 5, whereupon the electrode 3 is moved by the piston toward the electrode 2 and exerts a pressure upon the material placed between the electrodes.

The electrodes are supplied with welding current from a welding transformer 6 whose primary winding 7 is energized by connection to the bus bars $L^1$, $L^2$ of an alternating current supply circuit, while the secondary winding 8 of the transformer is connected across the electrodes 2 and 3. The system further comprises an electromagnetic welder switch 9 having an energizing winding $9^a$ and normally open contacts $9^b$, which are inserted between one terminal of the transformer winding 7 and the bus bar $L^2$, while the other terminal of said winding is directly connected to the bus bar $L^1$. An electromagnetic relay 10 has an energizing winding $10^a$ and normally open contacts $10^b$ and $10^c$. An electromagnetic relay 11 has an energizing winding $11^a$, normally open contacts $11^b$ and normally closed contacts $11^c$. A relay 12 has an energizing winding $12^a$ and normally closed contacts $12^b$. A relay 13 has an energizing winding $13^a$, normally open contacts $13^b$ and $13^c$ and normally closed contacts $13^d$. A relay 14 has an energizing winding $14^a$ and normally open contacts $14^b$ and $14^c$. A transformer 15 has a primary winding $15^a$ which is connected to the bus bars $L^1$ and $L^2$ and a secondary winding $15^b$, the latter supplying a unidirectional current to bus bars $L^3$ and $L^4$ through a rectifying tube 16 of any suitable type. A resistance 17 is connected in series with the winding $15^b$ and the rectifier 16 to limit the current which may be passed through the latter to a safe value. A pilot switch 18 is provided for controlling the operation of the system which further comprises resistors 19, 24 and 29, condensers 20, 22, 23, 25, 27 and 28 and double throw selector switches 21 and 26. Any or all of the condensers aforementioned may be of the adjustable type if desired, as may also be the resistors 24 and 29.

The apparatus is connected as follows: Relay coil 5 is connected across bus bars $L^1$, $L^2$ in series with normally open contacts $14^b$. One terminal of coil $14^a$ is connected to bus bar $L^1$ in series with control switch 18 and normally closed contacts $12^b$, while the other terminal of said coil is connected to line $L^2$. The switch 18 and normally closed contacts $12^b$ are shunted by a circuit from bus bar $L^1$ through resistor 19 and normally open contacts $13^c$. One terminal of coil $13^a$ is connected to bus bar $L^3$ while the other terminal is connected in series with contacts $10^b$ and $14^c$ to bus bar $L^4$, while condenser 20 is connected in shunt with coil $13^a$. One terminal of coil $10^a$ is connected to bus bar $L^3$, while the other terminal is connected through contacts 11ᵇ to bus bar L⁴. Condenser 22 is connected in parallel with coil 10ᵃ. Condenser 23 is connected in parallel with resistor 24 and has one terminal connected to bus bar L³, while the other terminal of said condenser is connected to the center pole of the double throw switch 21 by means of which it may be connected in parallel to condenser 22 or connected across the bus bars L³, L⁴, in which case it acts as a smoothing condenser to the direct current circuit. One terminal of coil 11ᵃ is connected to bus bar L³, while the other terminal is connected through normally closed contacts 13ᵈ to bus bar L⁴. Condenser 25 is connected in parallel to coil 11ᵃ. One terminal of coil 12ᵃ is connected to bus bar L³, while the other terminal is connected through contacts 13ᵇ to bus bar L⁴. Condenser 27 is connected in parallel with coil 12ᵃ, while condenser 28 which is paralleled by resistor 29 has one terminal connected to bus bar L³ and its other terminal to the center pole of the double throw switch 26 by means of which condenser 28 may be connected either in parallel with condenser 27 or may be connected across the bus bars L³, L⁴.

With the apparatus connected as described and the bus bars L¹, L² energized it functions as follows: Current flows through the primary winding 15ᵃ of transformer 15 and induces a voltage in the secondary winding 15ᵇ, which voltage is rectified through the rectifier 16. A current therefore flows from L³ through 11ᵃ, contacts 13ᵈ to L⁴ and condenser 25 is charged and relay 11 operates to close contacts 11ᵇ and open contacts 11ᶜ. Closure of contacts 11ᵇ connects coil 10ᵃ and parallel condenser 22 across L³, L⁴ to charge the latter and relay 10 closes contacts 10ᵇ and 10ᶜ.

If now the pilot switch 18 is closed current flows from L¹ over switch 18, contacts 12ᵇ, coil 14ᵃ to L² and relay 14 closes contacts 14ᵇ and 14ᶜ. Closure of contacts 14ᵇ energizes solenoid 5 which operates valve 4 to move the welder jaw 3 towards the jaw 2 to exert pressure on a work-piece therebetween. Closure of contacts 14ᶜ completes a circuit from L³ through coil 13ᵃ, contacts 10ᵇ and 14ᶜ to L⁴ and relay 13 is energized, while condenser 20 is charged. Relay 13 closes contacts 13ᵇ, 13ᶜ and opens contacts 13ᵈ. This disconnects coil 11ᵃ, but the relay armature is not released until the energy which is stored up in condenser 25 is discharged through coil 11ᵃ, the discharge current flowing in the same direction as the previously flowing line current. After some time the coil 11ᵃ is deenergized whereupon the contacts 11ᵇ are opened and contacts 11ᶜ are closed. Opening of contacts 11ᵇ disconnects relay coil 10ᵃ from its current supply, but the relay is temporarily maintained energized by the discharge current of condenser 22 in the manner aforedescribed for relay 11. When contacts 11ᶜ close, coil 9ᵃ is energized by a current flowing from L¹ over contacts 10ᶜ, 11ᶜ through coil 9ᵃ to line L². This closes contacts 9ᵇ and connects the primary coil 7 of transformer 6 across lines L¹, L² and sends a secondary current from the coil 8 through the jaws 2 and 3 and the work-piece. When the condenser 22 has been discharged, the relay 10 opens contacts 10ᵇ and 10ᶜ. Opening of contacts 10ᶜ deenergizes coil 9ᵃ and as a result opens contacts 9ᵇ to deenergize the transformer 6 and thus terminate the flow of welding current. The opening of contacts 10ᵇ disconnects the coil 13ᵃ from the line and discharges condenser 20 through said coil as aforedescribed. When the coil 13ᵃ is deenergized the contacts 13ᵇ and 13ᶜ are opened and contacts 13ᵈ are closed. Opening of contacts 13ᶜ while contact 12ᵇ is open deenergizes coil 14ᵃ which opens contacts 14ᵇ and deenergizes solenoid 5 and reverses the valve 4 to withdraw the jaw 3 from the jaw 2, the interval between the moment the welding current is cut off and the moment when the jaws are separated being determined by the discharge of the condenser 20. Opening of contacts 13ᵇ disconnects coil 12ᵃ and after a time interval determined by condenser 27 the contacts 12ᵇ close again to thereby cause reversal of the valve 4 and the cycle is repeated as aforedescribed.

By varying the condenser 22 the time of application of the welding current can be varied and if the time obtainable with condenser 22 adjusted for maximum capacity is insufficient, condenser 23 is connected in parallel therewith by selector switch 21 to thereby increase the time interval obtainable. Similarly the time during which pressure is applied after the welding current is cut off is determined by condenser 20, while the time for pressing the jaws together prior to the application of welding current is controlled by condenser 25, and the time during which the welding jaws are opened and reclosed is adjusted by condenser 27 and, if desired, by condenser 28 which latter may be connected in parallel with the former by the selector switch 26.

Fig. 2 illustrates a modification of the system illustrated in Fig. 1. In this modification the welding current circuit is completed in response to the rise of the fluid pressure in the cylinder which operates the electrodes so that the current starts flowing when the pressure on the electrodes attains a given value. For this purpose a pressure switch 30 is provided, having normally open contacts 30ᵃ which are closed when the pressure in the cylinder 1 attains a given value, and normally closed contacts 30ᵇ which are closed when the pressure in the cylinder is below said value. The contacts 30ᵃ are in series with the coil 9ᵃ of the welder switch 9 and thus permit closure of the latter when the pressure in the cylinder 1 has attained a given value. The contacts 30ᵇ open the energizing circuit of the coil 10ᵃ when the desired pressure in the cylinder is attained and this action in turn causes opening of the welder switch 9 after a given time interval which is determined by the capacity of the condenser 22 in the manner aforedescribed in connection with Fig. 1.

What I claim as new and desire to secure by Letters Patent is:

1. In a control system, the combination of a plurality of electromagnetic relays adapted to be operated in sequence, each of said relays having an operating winding, a plurality of electric circuits adapted to control said relays, means for controlling said electric circuits to effect sequentially the steps of energizing the operating winding of one of said relays, energizing the operating winding of another of said relays, deenergizing the operating winding of said one relay, deenergizing the operating winding of said other relay and thereafter repeating the aforementioned steps, and individual energy storage means including condensers respectively connected in circuit in parallel relation with the operating windings of certain of said relays and providing for continued energization of the operating windings of the respective relays for a given time after their disconnection from their respective energizing circuits, to thereby provide given time intervals between the aforesaid steps.

2. In a welder control system requring an electromagnet and an electromagnetic switch, respectively to control fluid pressure supply and current supply for the electrodes, in combination, an electromagnet, an electromagnetic switch, a plurality of electromagnetic relays, means comprising a plurality of circuits to control said relays for effecting sequential energization of said electromagnet, energization of said electromagnetic switch, deenergization of said electromagnetic switch, deenergization of said electromagnet, and reenergization of said electromagnet, and individual condenser storage means for certain of said relays affording the latter a given time delay in responding to their disconnection from their respective energizing circuits thereby to introduce given time elements into the aforesaid sequence effected by said relays.

3. In a welder system requiring an electromagnet and an electromagnetic switch, respectively to control fluid pressure supply and current supply for the electrodes, in combination, an electromagnet, an electromagnetic switch, electromagnetic means for effecting energization of said electromagnet, electromagnetic means for effecting energization of said electromagnetic switch, electromagnetic means for effecting deenergization of said electromagnet, means insuring sequential action of such electromagnetic means in their herein recited order, and individual condenser storage means for certain of the aforementioned electromagnetic means affording the latter given time delay in response thereof.

4. In a cyclic welder control system requiring an electromagnet and an electromagnetic switch, respectively to control fluid pressure supply and current supply for the electrodes, in combination, an electromagnet, an electromagnetic switch, means to energize said electromagnet, means to energize said electromagnetic switch following energization of said electromagnet and to deenergize said electromagnetic switch while said electromagnet remains energized, means to deenergize said electromagnet following deenergization of said electromagnetic switch, and individual condenser energy storing means associated with the aforementioned means to render each aforementioned action thereof subject to a given time delay.

5. In a welder control system requiring an electromagnet and an electromagnetic switch, respectively to control fluid pressure supply and current supply for the electrodes, in combination, an electromagnet, an electromagnetic switch, a plurality of electromagnetic relays adapted to be operated in a predetermined sequence, means for subjecting said electromagnet and said electromagnetic switch to control by said relays, each of said relays having an operating winding, a plurality of electric circuits respectively adapted to control energization of the operating windings of said relays, means for controlling said electric circuits to effect sequentially the operations of energizing the operating winding of one of said relays, energizing the operating winding of another of said relays, deenergizing the operating winding of said one relay, deenergizing the operating winding of said other relay and thereafter repeating the aforementioned operations, and individual energy storage means including condensers respectively connected in circuit in parallel relation with the operating windings of said relays and providing for continued energization of the operating windings of the respective relays for a given time after their disconnection from their respective energizing circuits, to thereby provide given time intervals between the aforesaid operations.

6. In a welder control system requiring an electromagnet and an electromagnetic switch, respectively to control fluid pressure supply and current supply for the electrodes, in combination, an electromagnet, an electromagnetic switch, a plurality of electromagnetic relays adapted to be operated in a predetermined sequence, each of said relays having an operating winding, a plurality of electric circuits respectively adapted to control energization of the operating windings of said relays, one of said relays being adapted to control energization of said electromagnet, another of said relays being adapted to control energization of said electromagnetic switch, means including condenser energy storage means in circuit with the operating winding of said last mentioned relay to maintain energization thereof for a predetermined period whereby a time delay in the operating energization of said electromagnetic switch is insured, another of said relays providing when energized a maintaining circuit for said first mentioned relay and including a condenser energy storage circuit affording continued energization of said third mentioned relay for a given time interval after interruption of its energizing circuit and further including contacts subject to control by said second mentioned relay upon opening of the latter to effect interruption of said energizing circuit, and another of said relays energized upon closure of said third mentioned relay and including a condenser energy storage circuit insuring continued energization thereof and interruption of the energizing circuit of the first mentioned relay for a given period after deenergization of the latter.

7. In a welder control system, in combination, an electromagnet and an electromagnetic switch, a first electromagnetic relay controlling said electromagnet, time delay means to delay energization of said electromagnet switch after energization of said electromagnet, a second electromagnetic relay affording energization of said electromagnetic switch subject to control by said time delay means and said first electromagnetic relay, said second electromagnetic relay including energy storage means for maintaining energization thereof for a predetermined period after initiation of deenergization thereof, a third electromagnetic relay providing when energized a maintaining circuit for said first electromagnetic relay and including an energy storage circuit affording continued energization of said third electromagnetic relay for a given time interval after interruption of its energizing circuit and further including contacts actuated by opening of said second electromagnetic relay to interrupt said energizing circuit, and a fourth electromagnet relay energized upon closure of said third electromagnetic relay and including an energy storage circuit affording continued energization of said fourth electromagnetic relay and interruption of the energization of said first electromagnetic relay for a given period after deenergization of the latter.

CARROLL STANSBURY.